(12) United States Patent
Heiss

(10) Patent No.: US 6,747,952 B1
(45) Date of Patent: Jun. 8, 2004

(54) METHOD FOR OPTIMIZING THE USE OF CONNECTING SECTIONS IN VBR TRAFFIC

(75) Inventor: Herbert Heiss, Unterhaching (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/463,076

(22) PCT Filed: Jun. 3, 1998

(86) PCT No.: PCT/DE98/01504

§ 371 (c)(1),
(2), (4) Date: Jan. 18, 2000

(87) PCT Pub. No.: WO99/04535

PCT Pub. Date: Jan. 28, 1999

(30) Foreign Application Priority Data

Jul. 17, 1997  (DE) .......................................... 197 30 760

(51) Int. Cl.⁷ .............................................. G01R 31/08
(52) U.S. Cl. ....................................... 370/235; 370/252
(58) Field of Search ................................ 370/252, 253, 370/254, 235, 389, 395.1, 395.21, 395.3, 395.41, 395.43, 395.64, 395.65, 410; 710/29, 52, 53, 57

(56) References Cited

U.S. PATENT DOCUMENTS 5,675,576 A * 10/1997 Kalampoukas et al. ..... 370/232
5,909,443 A * 6/1999 Fichou et al. ............... 370/412
5,946,324 A * 8/1999 Mishra et al. .............. 370/468
5,982,748 A * 11/1999 Yin et al. .................... 370/232

OTHER PUBLICATIONS

Nasir Ghani, et al., Measurement–Based Flow Control for ABR Services in ATM Networks (1), vol. 8, No. 1, (1997), pp. 39–53.

Raj Jain et al., ATM Forum Document Number: ATM Forum/96–1172, ERICA Switch Algorithm: A Complete Description, (1996), pp. 1–45.

A. Arulambalam et al., Allocating Fair Rates for Available Bit Rate Service in ATM Networks, IEEE Communications Magazine, vol. 34, No. 11, (1996), pp. 92–100.

* cited by examiner

*Primary Examiner*—Wellington Chin
*Assistant Examiner*—Brenda Pham
(74) *Attorney, Agent, or Firm*—Fish & Richardson P.C.

(57) ABSTRACT

In VBR connections, control cells are inserted into the stream of ATM cells. These control cells are fed back to the transmitting device. In order to allow control to be carried out efficiently, the stream of ATM cells associated with the VBR connections is measured and is supplied to a control method. The result of this control method is then, if required, entered in the information portion of control cells that are transmitted back.

5 Claims, 3 Drawing Sheets

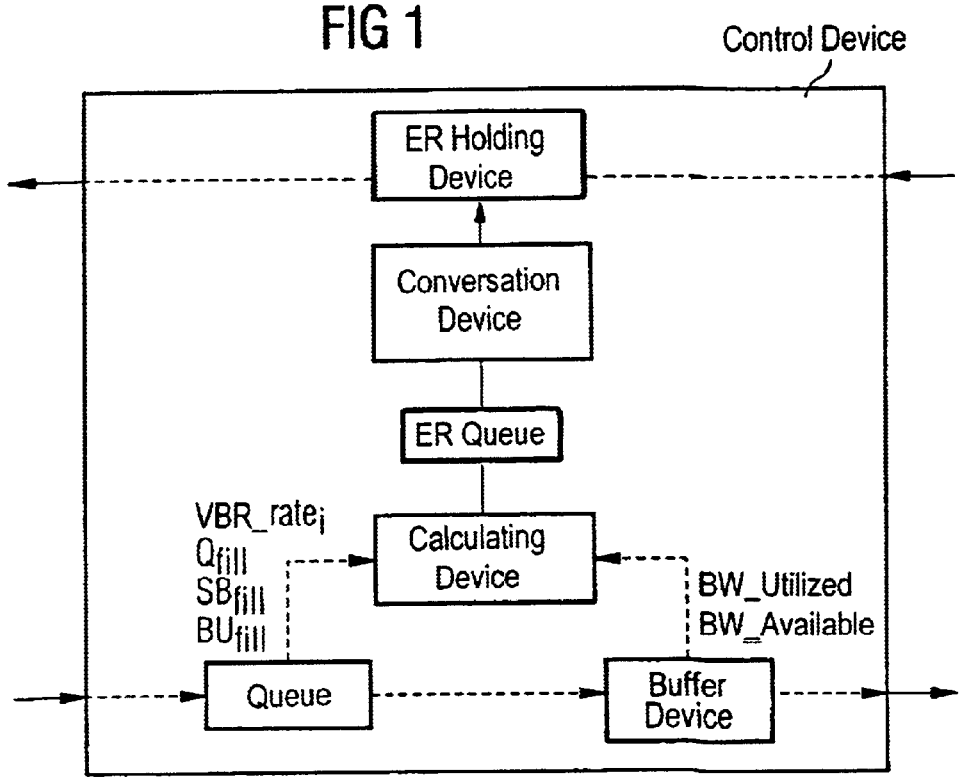

METHOD FOR OPTIMIZING THE USE OF CONNECTING SECTIONS IN VBR TRAFFIC

BACKGROUND OF THE INVENTION

1. Field of the Invention

Figure 2A:
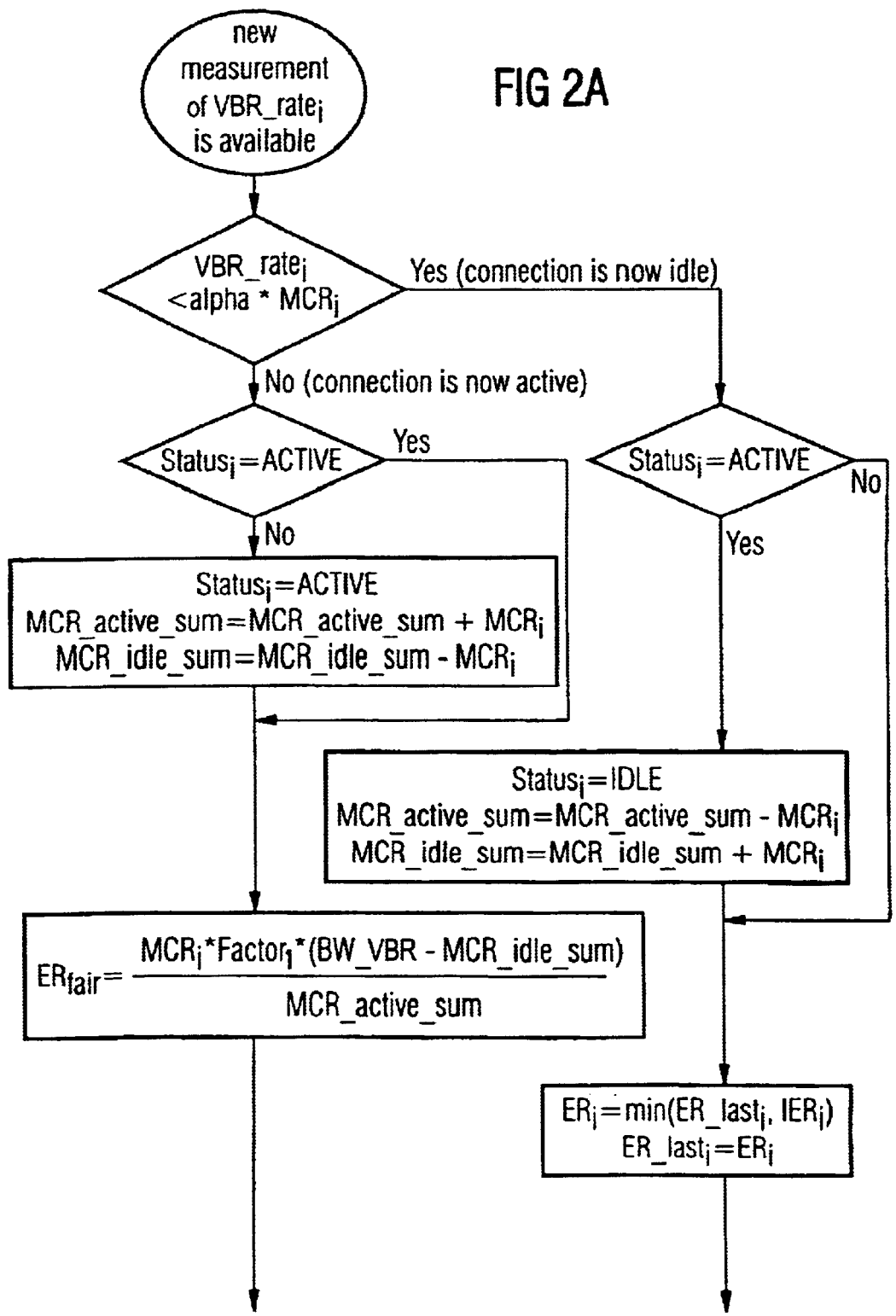

The invention relates to a method for optimizing the load level on connection sections for VBR traffic that has ATM cells which are associated with VBR traffic and are transmitted between at least one transmitting device and at least one receiving device via common connection sections, and whose frequency is measured on a connection specific basis.

2. Description of the Related Art

A number of connection types are defined for connections via which information is transmitted using an asynchronous transfer mode (ATM). For example, connections which are used to transmit information at a constant bit rate (CBR) are distinguished from connections via which information is transmitted at a variable bit rate. VBR connections are connections via which low-priority information is transmitted between a transmitting device and a receiving device.

To achieve this, one might implement a system in which—therefor; control cells are inserted in a timed pattern into the stream (originating from the transmitting device) of ATM cells associated with a connection. As a rule, the control cells could be inserted for every $32^{nd}$ ATM cell. The ATM cells are then supplied together with the control cells to the receiving device in question. The latter removes from the cell stream those ATM cells carrying the wanted information. In addition to this, the control cells are removed and are fed back to the transmitting device together with connection-related data as well as data described in the current status of the connection sections. In the transmitting device, the connection-related information is removed from the control cells and, if necessary, the transmission rate is adapted.

In order to control these processes, the information portion of the control cells contains a field ER (Explicit Rate Field) to which information is written which is determined from a specific control method.

The proposal to the ATM Forum 96-1172 proposes that ATM cells associated with VBR traffic be controlled on the basis of a control method (ERICA) disclosed there. This is based on a minimum cell rate of MCR=0. This means that the explicit rate ER calculated by the control method (ERICA) is independent of the minimum cell rate MCR although this is actually a special case for a large number of transmissions.

The document "Measurement-Based Flow Control for VBR Services in ATM Networks, Nasir Ghani, John W. Mark, Department of Electrical and Computer Engineering, University of Waterloo, Waterloo, Ontario N2L 3G1-Canada, Vol. 8, No. 1, January–February 1997" discloses a method describing how the measurement of ATM cells allows the network to be utilized better. In this case, fairness is desired, although this is not proportional to the minimum cell rate MCR. However, this results in a specific type of fairness, which is not always efficient in practical situations.

The document "Allocating Fair Rates for Available Bit Rate Service in ATM Networks, Ambalavanar Arulambalam and Xiaoquiang Chen, Bell Laboratories Nirwan Ansari, New Jersey Institute, of Technology; IEEE Communications Magazine, November 1996", likewise discloses a method for bandwidth assignment. Once again, the known Erika algorithm is referred to, which is useable only to a limited extent in overload situations.

Figure 2B:
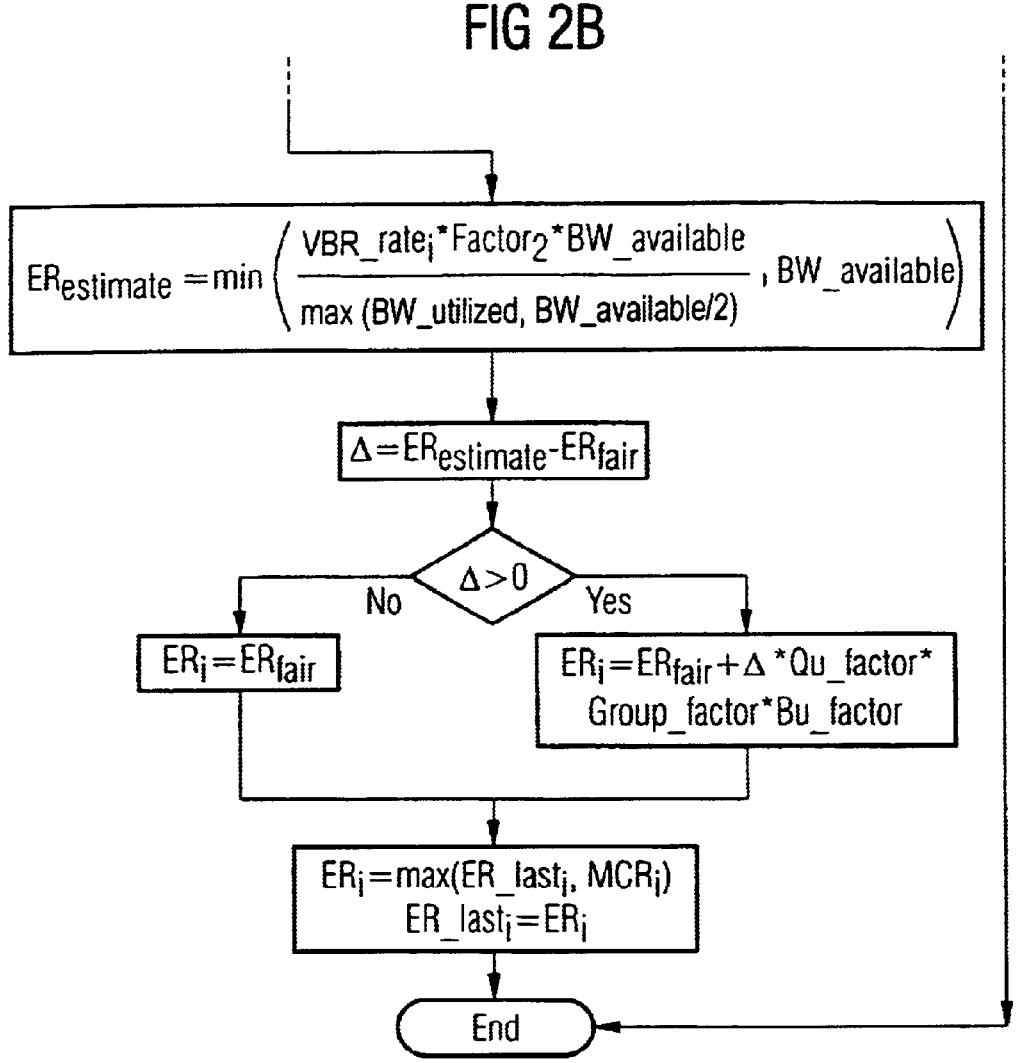

The invention will be explained in more detail in the following text with reference to an exemplary embodiment. In the figures, FIG. 1 shows an apparatus on which the control method according to the invention is used FIG. 2 shows the control method according to the invention FIG. 1 shows an apparatus on which the control method according to the invention is used. Accordingly, VBR cells arriving in a control device ERST are initially buffer-stored for a short time in queue which is in the form of a memory Q. During this time, the virtual channel number VCI and the virtual path number VPI are taken from the cell header. Since, at the start of setting up a connection, an association is produced between the values VCI/VPI and the connection type, the virtual numbers VCI/VPI can now be used to determine the connection type of the present connection. In particular, ATM cells associated with VBR connections can be verified in this way. This is a major aspect since ATM cells of all connection types, that is to say ATM cells from CBR or VBR traffic, also pass through the switch.

When ATM cells associated with VBR connection i arrive, the arrival rate $VBR\_rate_i$ may be determined. In addition, further directly connection-related parameters are measured. These include the present filling level of the (connection-related) queue $Q_{fill}$, the present filling level of the scheduler blocks $SB_{fill}$, and the present filling level of the parameters $BU_{fill}$, which is calculated as the sum of the scheduler blocks. In this context, the term scheduler block means a group of connections via each of which ATM cells are passed and which are multiplexed onto a single connection section or virtual path with a predetermined peak bit rate. Once such a measurement has been carried out, the measured parameters are supplied to an input queue in the ERCALC apparatus.

These parameters are used as an input variable for the control method SERA, which is controlled in the device ERCALC. After the measurement process, the ATM cell associated with the VBR connection is once again released on the basis of a statistical multiplexing algorithm (for example Weighted Fair Queing) and is supplied to a further device B, in the form of a buffer memory. A variable BW_utilized is determined there, which reflects the non-connection-specific load level on the connection section. This is the present rate which the scheduler block has used for all the VBR connections in the relevant scheduler block. Furthermore, a variable BW_available is determined here, which reflects the present rate which would be free for the sum of all the VBR connections in the relevant scheduler block. These measurements are triggered cyclically at the output by means of scheduler-block-related events, while the measurements on the input side are triggered by connection-related events. The values measured (on the output side) are stored in a further input queue (not shown in FIG. 1)—and are likewise supplied as input parameters to the control method SERA used in the device ERCALC.

The control method SERA will be explained in more detail in the following text with reference to the flowchart shown in FIG. 2.

In general, it can be stated that the control method SERI is carried out once per connection group. Only VBR connections are used in this case. Each VBR connection can in this case be classified to just one connection group. For example, a connection group comprises a group of all those connections which are associated with the same output connection and whose total rate is at least equal to the rate of the output connections. Furthermore, it may comprise a group of all those connections which are associated with the same virtual path and whose total rate is at most equal to the rate of the virtual path.

The control method SERA uses a minimum cell rate $MCR_i$ per connection, which is strictly greater than 0. The variable (Explicit Cell Rate) ER calculated by the control method for VBR connection is thus greater than or equal to the minimum cell rate $MCR_i$ for the connection i.

The control method SERA calculates the status of a connection. The VBR connection is inactive or idle when the last measured value VBR_ratei for the connection i is less than alpha×$MCR_i$. Otherwise, this connection is assigned to the value active. In this case, it should be remembered that alpha is strictly between 0 and 1.

The control method SERA includes two parameters per connection group. One of these is the parameter MCR_idle_sum, which defines the total number of all the MCRs of all the presently inactive VBR connections in a group. The second parameter is the parameter MCR_active_sum which defines the total number of all the MCRs for the active VBR connections in a connection group. When a VBR connection is set up with a specific minimum cell rate MCR, it is regarded as being inactive (idle), and the parameter MCR_idle_sum is increased by the value MCR. When the VBR connection is cleared, the parameter MCR_idle_sum is reduced by the value MCR when the connection was inactive, and the parameter MCR_active_sum is reduced by the value MCR when the connection was active. The connection status may thus be active or inactive (idle), with the appropriate information being carried in a status bit.

The control method SERA defines a new value of $ER_i$, whenever a measurement of the parameter VBR_rate_i is available. However, $ER_i$ may also be calculated for other reasons—for example when a timer times out.

The control method SERA first of all determines the new status of a VBR connection by comparing the value VBR_rate_i with the value $MCR_i$. The connection has a new inactive status (idle) if the parameter VBR_rate_i is less than alpha×$MCR_i$. Otherwise, this connection is assigned the new status active.

When the connection status changes from inactive to active, the parameter MCR_idle_sum for the connection group is reduced by the value $MCR_i$ and the parameter MCR_active_sum is increased by the value $MCR_i$. When the connection status changes from active to inactive, the parameter MCR_active_sum is reduced by the value $MCR_i$, and the parameter MCR_idle_sum is increased by the value $MCR_i$.

For each VBR connection, the control method, SERA uses the value of an initially determined Explicit Cell Rate $IER_i$ which is greater than the value $MCR_i$. Furthermore, a value $ER\_last_i$ for the most recently calculated value $ER_i$ are in this case kept for each VBR connection. The initially determined value or the value ER lasti is $IER_i$.

When the new status is inactive, the value $ER_i$ is set to the smallest of the values $ER\_last_i$, and $IER_i$ as well as the value $ER\_last_i$ are set to the value $ER_i$ just calculated.

When the new status is active, the control method SERA calculates the values $ER_{fair}$ and $ER_{estimate}$. The value $ER_i$ to be used then is set to be greater than the value $ER_{fair}$ and less than the maximum of the values $ER_{fair}$ and $ER_{estimate}$.

The control method SERA provides a static bandwidth BW_VBR for a connection group in order to calculate the value $ER_{fair}$. This is available for all VBR connections in the connection group. The value BW_VBR changes only when a non-VBR connection in the connection group is set up or cleared. If a connection group uses only one connection section and the group contains only VBR connections, the value BW_VBR would be equal to the rate on the connection section. In the same way, the sum of the $MCR_i$ for all the VBR connections in the group is always less than the value BW_VBR.

In order to calculate the value $ER_{fair}$ the bandwidth which is reserved for the active connections is set to BW_VBR minus MCR_idle_sum. This rate is multiplied by a constant factor1, which has values between 0 and 1. The available rate for the active connections is thus reduced. The remaining rate is split between the active VBR connections in the connection group by adding multiplicative weightings equal to $MCR_i$/MCR_active_sum to a connection group. This means that the fair proportion will be given the rate $ER_{fair}$ for the active connection i by the constant factor1 being multiplied by BW_VBR_MCR_idle_sum with $MCR_i$/MCR_active_sum.

In order to calculate the parameter $ER_{estimate}$, the control method SERA includes the most recently measured values of the parameter BW_utilized, which is presently used by the VBR connections in the connection group. Furthermore, the most recently measured rate of the parameter BW_available is maintained here, which is presently available for the VBR connections within the connection group. The instantaneous load factor of the group LF is then formed from the ratio of the parameters BW_utilized/BW_available. In order to use the connection section optimally, all the VBR connections could increase their rate by a factor 1/LF. In order to avoid the accumulation of large rates, the factor is chosen to be min(2, 1/LF)=min(2, BW_available/BW_utilized)=BW_available/max(BW_utilized, BW_available/2). Even if the value $ER_{estimate}$ is greater than the value BW_VBR, the value becomes BW_available.

In order to calculate the parameter $ER_{estimate}$, the control method SERA multiplies the measured values VBR_rate_i by a factor factor2 and by a factor which is formed from min(2, BW_available/BW_utilized)=BW_available/max(BW_utilized, BW_available/2). The factor factor2 is a constant value which varies between 0 and 1. From now on, the minimum is taken of the calculated values $ER_{estimate}$ and BW_VBR for a connection group, and this value then replaces the value of $ER_{estimate}$.

If the value $ER_{estimate}$ is less than or equal to the value $ER_{fair}$, then $ER_i$ is set from $ER_{fair}$.

If the value $ER_{estimate}$ is greater than $ER_{fair}$, then $ER_i$ is set to $ER_{fair}$+factor3×($ER_{estimate}$−$ER_{fair}$=$ER_{fair}$+factor3×delta. The factor factor3 is described below. This is greater than or equal to 0 and less than or equal to 1. If the factor3 is 1, then $ER_i$ becomes $ER_{estimate}$.

In order to determine the factor $factor_3$, the control method SERA multiplies the values Qu_factor and Group_factor as well as Bu_factor. In order to determine the value Qu_factor, the control method maintains the most recently measured number of cells $N_i$ which are located in a queue for a connection i and a constant N_large. The value Qu_factor is a continuous, monotonically rising, partially linear function of $N_i$. It is 0 if $N_i$ is greater than or equal to N_large. It is equal to (N_large—$N_i$)/N_large if Ni is less than N_large. It is 1 if $N_i$=0.

With regard to the value Group_factor, the control method SERA maintains the most recently measured number of cells Ngroup which are located in a queue for the connection group in question and which comprise the connection i, as well as maintaining a constant N_group_large. Group_factor is a continuous, monotonically rising, partially linear function of Ngroup. It is 0 if Ngroup is greater than or equal to N_group_large. (N_group_large–Ngroup)/N_group_large. It is equal to if Ngroup is greater than or equal to N_group-large. It is 1 if Ngroup=0.

With regard to the value Bu_factor, the control method SERA maintains the most recently measured number of cells N_buffer which are located in a queue in the buffer store and are split up by the connection group and [lacuna] to a constant value N_buffer_large. Bu_factor is a continuous, monotonically rising, partially linear function of N_buffer. It is 0 if N_buffer is greater than or equal to N_buffer_large. It is equal to N_buffer_large—N_buffer divided by N_buffer_large if N_buffer is less than or equal to N_buffer_large. It is one for 1 if N_buffer=0.

Factor3 is characterized in that it assumes the value 0 if the number of cells in the entire buffer is greater than the value N_buffer or if the number of cells in the buffer for the connection group is assigned to a connection i, which is greater than the number N_group, or if the number of cells in the buffer per connection i is greater than N_large. Factor3 is 1 if the buffer is empty. Factor3 is in the vicinity of one if the memory filling level per connection, connection group and buffer is low. It is in the vicinity of zero if the memory filling level per connection or connection group or buffer is high.

Once the value $ER_i$ has been calculated, $ER_i$ is increased to $MCR_i$ if $ER_i$ is less than $MCR_i$. In the same way, the value $ER\_last_i$ is set to the value $ER_i$ just calculated.

In the end, the control method determines a connection-related number $ER_i$ (Explicit Cell Rate) which reflects the rate which the switch has assigned for this connection. This is expressed in cells per second. It is greater than or equal to the predetermined minimum cell rate $MCR_i$ for the connection i and is stored in the device ERCALC as well as a queue QU in which case the predetermined minimum cell rate $MCR_i$ is always greater than or equal to 1 cell/second. Storage may in this case be in the form of a concatenated list.

Before a value (determined in this way) of one of the control cells transmitted in the reverse direction can be transferred, it is first of all necessary to convert it to an exponent/Mantissa format. This is done in the device ERCONV. In the device ERUP, the corresponding value is then entered in the information portion of the control cells transmitted in the reverse direction, as required.

Finally, it should be mentioned that the division by the factor2 in order to calculate the parameter $ER_{estimate}$ should be regarded as a special embodiment. Other embodiments are likewise feasible here, however, since the division by 2 is not absolutely essential.

What is claimed is:

1. A method for optimizing a load level on connection sections for VBR traffic, comprising the steps of:

transmitting ATM cells which are associated with said VBR traffic between a transmitting device and a receiving device via common connection sections:

measuring the frequency of said ATM cells on a connection-specific basis;

calculating a first value independently of an instantaneous load on a connection section, the first value representing long-term load conditions on the connection section;

assigning said first value to a connection;

estimating a second value on the basis of a measured line load level, the second value representing short-term load conditions on the connection section; and setting an explicit cell rate on a connection-specific basis by a control method, wherein said explicit cell rate is greater than or equal to said first value and less than or equal to the larger of said first value and second value, wherein said explicit cell rate is closer to said first value when a memory filling level is high, and wherein said explicit cell rate is closer to the larger of said first value and said second value when said memory filling level is low.

2. The method as claimed in claim 1, characterized in that VBR connections are split into active or inactive (idle) connection classes by determining whether the measured frequency ($VBR\_rate_i$) is less than the connection-specific bandwidths ($MCR_i$) multiplied by a factor alpha, with the latter being strictly between 0 and 1.

3. The method as claimed in claim 1 or 2, characterized in that the first value ($ER_{fair}$) is determined by subtracting the sum of the connection-specific bandwidths ($MCR_i$) over the inactive connections from the available bandwidth (BW_VBR), and by splitting up the bandwidth which then remains among the active connections in proportion to the connection-specific bandwidth ($MCR_i$) of the respective active connection.

4. The method as claimed in one of the preceding claims, characterized in that the Explicit Cell Rate ($ER_i$) for inactive connections is equated to the minimum of the last Explicit Cell Rate ($ER_i$) calculated for the connection and a connection-specific value ($IER_i$).

5. The method as claimed in one of the preceding claims, characterized in that, for a connection section whose load level is relatively low, the second value ($ER_{estimate}$) is equal to a constant factor (factor2) multiplied by the measured frequency ($VBR\_rate_i$).

* * * * *